(12) United States Patent
Teneze et al.

(10) Patent No.: US 11,994,602 B2
(45) Date of Patent: May 28, 2024

(54) METHOD FOR CALIBRATING AN AIRBORNE GONIOMETRY APPARATUS FOR LOW FREQUENCIES

(71) Applicant: BULL SAS, Les Clayes-sous-Bois (FR)

(72) Inventors: Bernard Teneze, La Roque d'Antheron (FR); Philippe Charton, Aix-en-Provence (FR)

(73) Assignee: BULL SAS, Les Clayes-sous-Bois (FR)

( * ) Notice: Subject to any disclaimer, the term of this patent is extended or adjusted under 35 U.S.C. 154(b) by 157 days.

(21) Appl. No.: 17/862,752

(22) Filed: Jul. 12, 2022

(65) Prior Publication Data
US 2023/0113476 A1 Apr. 13, 2023

(30) Foreign Application Priority Data

Jul. 13, 2021 (EP) ..................................... 21305979

(51) Int. Cl.
*G01S 3/02* (2006.01)
*G01S 3/46* (2006.01)

(52) U.S. Cl.
CPC .............. *G01S 3/023* (2013.01); *G01S 3/465* (2013.01)

(58) Field of Classification Search
CPC .......... G01S 3/023; G01S 3/465; G01S 1/026; G01S 3/146; H01Q 3/267
See application file for complete search history.

(56) References Cited

U.S. PATENT DOCUMENTS

| | | | | |
|---|---|---|---|---|
| 7,499,803 | B2 * | 3/2009 | Hunter | .................... G01S 3/023 |
| | | | | 342/420 |
| 11,131,751 | B2 * | 9/2021 | Steinmetz | ................. G01S 7/40 |
| 11,294,019 | B2 * | 4/2022 | Saulnier | .................. G01S 1/026 |
| 2006/0238413 | A1 | 10/2006 | Yehudaie | |

FOREIGN PATENT DOCUMENTS

| | | |
|---|---|---|
| EP | 1818681 A1 | 8/2007 |
| EP | 3506428 A1 | 7/2019 |
| JP | H1084219 A | 3/1998 |
| WO | 2007047119 A2 | 4/2007 |

OTHER PUBLICATIONS

European Search Report issued in EP21305979.3 dated Mar. 31, 2022 (7 pages).

* cited by examiner

*Primary Examiner* — Seung H Lee
(74) *Attorney, Agent, or Firm* — ARC IP Law, PC; Joseph J. Mayo

(57) ABSTRACT

The invention includes a method for calibrating at low frequency and in-flight a goniometry apparatus including an antenna array, on board an air carrier. The method includes for an angular position of reception, calibrating the airborne goniometry apparatus at a given frequency, comprising transmitting, by means of a calibration transmitter, at the given frequency and in the direction of the goniometry apparatus, at least two calibration signals, with polarizations orthogonal to each other. The method also includes measuring a response of the antenna array for each of the signals. The invention also includes a system implementing such a method.

14 Claims, 3 Drawing Sheets

METHOD FOR CALIBRATING AN AIRBORNE GONIOMETRY APPARATUS FOR LOW FREQUENCIES

This application claims priority to European Patent Application Number 21305979.3, filed 13 Jul. 2021, the specification of which is hereby incorporated herein by reference.

BACKGROUND OF THE INVENTION

Field of the Invention

The invention relates to a method for calibrating an airborne goniometry apparatus, in particular for low frequencies. It likewise relates to an installation implementing such a method.

The field of the invention is the field of airborne goniometry apparatuses for detecting radiofrequency transmitters, in particular radio transmitters transmitting low-frequency signals.

Description of the Related Art

An airborne goniometry apparatus generally consists of an array of antennas, also referred to as antenna array, and at least one receiver connected to said array of antennas. It is used to detect the angular position, azimuth and elevation angles, of radiofrequency transmitters at ground or sea level when it is on board an air carrier, such as an airplane. To this end, the goniometry apparatus uses a calibration table providing an angular position for each frequency and each polarization depending on the reception response of the goniometry apparatus.

The calibration table of a goniometry apparatus can be obtained during a calibration phase during which a transmitter transmits a calibration signal. The reception response of the antenna array is measured and stored in association with the known characteristics of the calibration signal, namely the frequency thereof, and its arrival angle (azimuth and elevation).

The calibration can be performed in the far field, at several tens of times the wavelength of the calibration signal. Moreover, at low frequencies, that is for frequencies lower than 500 MHz, the goniometry apparatus must be calibrated when on board the air carrier in order to take into account the effect of the metal structure of said carrier on the reception response of the antenna array. It is for these reasons that the low-frequency calibration of the airborne goniometry apparatus cannot be performed in an anechoic chamber since an anechoic chamber having dimensions sufficiently large so as to enable all these conditions to be met, in particular at low frequencies, does not exist.

Moreover, the currently known techniques for in-flight calibration of an airborne goniometry apparatus in order to determine a calibration table for each frequency, each polarization, and each angular position, are very time consuming and expensive.

One aim of the invention is to solve at least one of the above-mentioned shortcomings.

Another aim of the invention is to provide a solution for in-flight calibration at low frequency of an airborne goniometry apparatus in a less time consuming and less expensive manner.

BRIEF SUMMARY OF THE INVENTION

One or more embodiments of the invention enables at least one of these aims to be achieved by means of a method for calibrating at low frequency and in-flight a goniometry apparatus comprising an antenna array, on board an air carrier, said method comprising for an angular position of reception, a step of calibrating said airborne goniometry apparatus at a given frequency, comprising the following operations:

transmitting, by means of a calibration transmitter, at said given frequency and in the direction of said goniometry apparatus, at least two calibration signals, with polarizations orthogonal to each other, and measuring a response of said antenna array for each of said signals;

As such, at least one embodiment of the invention proposes performing the calibration of the goniometry apparatus when it is in flight, that is when it is on board an aerial carrier, which prevents this calibration from being performed in an anechoic chamber, and thus having to provide a very larger anechoic chamber, in particular for low frequencies.

Moreover, at least one embodiment of the invention enables a more precise calibration of the goniometry apparatus to be performed, in particular for low frequencies, since it enables the influences of the metal structure of said air carrier on which said goniometry apparatus is mounted, in particular for low frequencies, to be taken into account.

Furthermore, at least one embodiment of the invention enables a quicker, less time consuming and less expensive calibration of the airborne goniometry apparatus to be performed since it enables, in a single step performed for a given angular position and frequency, the calibration data of the goniometry apparatus to be determined for several, or all, the polarizations possible of the electromagnetic waves. Indeed, in one or more embodiments, based on calibration data measured in-flight for two polarizations orthogonal to each other, it is possible to deduce the calibration data for all the polarizations possible of a radiofrequency wave, since all polarization of a radiofrequency wave decomposes on the orthogonal base formed by said orthogonal polarizations of the calibration signals.

In at least one embodiment of the invention, "low-frequency radiofrequency signal" is understood to mean a radiofrequency signal the frequency of which is less than or equal to 500 MHz.

In at least one embodiment of the invention, "aerial carrier" is understood to mean any flying vehicle, such as an airplane, a helicopter, airship, balloon, a drone, etc.

In at least one embodiment of the invention, angular position is understood to mean a position defined by an azimuth angle and an elevation angle. The angular position of the goniometry apparatus is the relative position of said goniometry apparatus with respect to the calibration signal transmitter. In other words, the relative angular position between the aerial carrier and the calibration transmitter corresponds to the angular position of reception of each calibration signal.

According to one or more embodiments, the calibration signals can be transmitted simultaneously.

Such a feature enables the time for performing the calibration step to be reduced, and thus make the calibration less time consuming and less expensive.

In such a case, in one or more embodiments, in order to differentiate the two reception calibration signals at the goniometry apparatus, the calibration signals can have a frequency shift therebetween. This frequency shift can be minimal or negligible with respect to the frequency of each calibration signal, such that the calibration signals are considered as having the same frequency while being able to distinguish them upon reception.

For example, in one or more embodiments, the frequency difference, denoted A, between the calibration signals can be 200 kHz, but this value is not limiting and depends on the frequency of the calibration signals.

Still according to at least one embodiment, the frequencies F1 and F2 of the two calibration signals can be focused on the frequency $F_m$ for which the calibration is performed, such as:

$F1-F2=\Delta$, and $F_m-F_1=-\Delta/2$ and $F_m-F_2=+\Delta/2$.

Thus, each calibration signal has a frequency as close as possible to the frequency for which calibration is performed, while enabling them to be differentiated upon reception.

According to one or more embodiments, the calibration signals can be transmitted one at a time.

At least one embodiment, although less time consuming, enables two calibration signals to be used the frequency of which is equal to the frequency $F_m$ for which the calibration is performed.

According to one or more embodiments, the method may comprise, for the same angular position of reception, several iterations of the calibration step for different frequencies so as to perform a frequency scan over a given range of frequency.

Thus, in at least one embodiment, when the aerial carrier is in an angular position of reception relative to the transmitter, it is possible to scan an entire frequency range and measure calibration data for a multitude of frequencies in a range of frequencies. As a result, the time and cost associated with the calibration of the goniometry apparatus are reduced with respect to the current calibration techniques.

The range of frequencies can be scanned continuously. Preferably, in one or more embodiments, the range of frequencies is scanned according to a predetermined frequency pitch. The frequency pitch can be constant. Alternatively, in one or more embodiments, the frequency pitch can be different for different frequency ranges within the range of frequencies. For example, in one or more embodiments, a first frequency pitch can be used for a first frequency range and a second frequency pitch can be used for a second frequency range. According to at least one embodiment, the frequency pitch can be calculated according to a predetermined relationship taking into account the frequency for which calibration is performed.

According to one or more embodiments, the different frequencies for which calibration is performed can be previously defined and stored in a table.

In any case, in one or more embodiments, it is preferable to synchronize the calibration transmitter and the goniometry apparatus such that the transmission frequency of the transmitter is known by the goniometry apparatus at all times.

Advantageously, in one or more embodiments, the method according to the invention may comprise several iterations of the calibration step in different angular positions of reception, in particular predefined, and in particular along a predetermined calibration path.

Thus, in one or more embodiments, the aerial carrier can be moved into different angular positions and for each angular positions, at least one iteration of the calibration step can be performed. Preferably, in one or more embodiments, at each angular position the calibration step can be repeated several times in order to cover a frequency range, as described above. When the calibration measurements have been performed for the entire frequency range, the aerial carrier can be moved to a new angular position of reception. The angular positions of reception can be defined along a calibration path.

The calibration path can comprise a multitude of angular positions according to a constant or variable angular pitch. The angular pitch can be a combination of an angular azimuth pitch and an angular elevation pitch, or only one of these pitches.

The calibration path can be defined to cover an azimuth angle range, for example from 0° to 360°.

Alternatively or additionally, in one or more embodiments, the calibration path can be defined to cover an elevation angle range, for example from 0° to 90°, with:
  0° corresponding to the horizontal plane, that is the direction between the aerial carrier and the calibration transmitter is essentially horizontal. This configuration can be obtained by arranging the aerial carrier very far from the calibration transmitter; and
  90° corresponding to the vertical plane, that is the direction between the aerial carrier and the calibration transmitter is essentially vertical. This configuration can be obtained by arranging the aerial carrier directly above the calibration transmitter.

According to one or more embodiments, the calibration path can comprise any combination of at least one of the following paths:
  at least one horizontal linear path,
  at least one upward helical path, and/or
  at least one downward helical path.

Preferably, in one or more embodiments, the calibration path can be a combination of several of these paths to cover a maximum of azimuth angles and elevation angles in a minimum amount of time.

For example, in one or more embodiments, the calibration path can comprise:
  starting from very far from the transmitter and moving closer towards the transmitter: a horizontal path followed by an upward helical path until the goniometry apparatus is directly above the transmitter; and
  starting directly above the transmitter and moving away from the transmitter: a downward helical path followed by a horizontal linear path.

Such a calibration path advantageously enables a maximum of angular positions of reception to be covered in a minimum amount of time, either in azimuth or elevation.

The method according to at least one embodiment of the invention can advantageously comprise, for an angular position and a frequency, at least one step for calculating by interpolation calibration data for at least one target polarization, which is different from orthogonal polarizations, based on calibration data measured at said frequency and at said angular position, for said calibration signals.

Thus, in one or more embodiments, it is possible to obtain calibration data even for the polarizations other than those of polarizations of calibration signals. To that end, in one or more embodiments, the target polarization is projected on the orthogonal base formed by the orthogonal polarizations of calibration signals. Then, the calibration data measured for each of the orthogonal polarizations are used to calculate the calibration data corresponding to each component of said target polarization in the orthogonal base. Lastly, in one or more embodiments, the calibration data obtained for each component of the target polarization are reconstructed in order to obtain the calibration data of the target polarization.

The method according to at least one embodiment of the invention can further comprise, for an angular position and a polarization, at least one calculation step for calculating calibration data for at least one unmeasured target frequency at said angular position and for said polarization, by interpolation of calibration data measured for several frequencies at said angular position and for said polarization. Such an interpolation is referred to as frequency interpolation in the rest of the application and takes into account the calibration data measured for several calibration frequencies, at said angular position and said polarization.

Thus, in one or more embodiments, it is possible to obtain by frequency interpolation, calibration data for frequencies for which no calibration data has been measured in-flight. As a result, in one or more embodiments, the method for calibrating according to the invention enables the flight time and associated cost to be reduced for the calibration of the goniometry apparatus.

The frequency interpolation can be performed by all known functions. For example, the frequency interpolation can be performed by the GRIDDATA function in MATLAB.

The frequency interpolation can be performed during, or after the in-flight calibration steps of the goniometry apparatus.

The frequency interpolation can be performed at the goniometry apparatus, at the calibration transmitter, or, preferably, on another apparatus.

The method according to at least one embodiment of the invention can further comprise, for a frequency and a polarization, at least one calculation step for calculating calibration data for at least one unmeasured target angular position, by interpolation of calibration data measured for several angular positions at said frequency and for said polarization. Such an interpolation is referred to as angular interpolation in the rest of the application.

Thus, in one or more embodiments, it is possible to obtain by angular interpolation, calibration data for angular positions for which no calibration data has been measured. As a result, in one or more embodiments, the method for calibrating enables the flight time and associated cost to be reduced for the calibration of the goniometry apparatus.

The angular interpolation can be performed by all known functions. For example, the angular interpolation can be performed by the GRIDDATA function in MATLAB.

The angular interpolation can be performed during, or after the in-flight calibration steps of the goniometry apparatus.

The angular interpolation can be performed at the goniometry apparatus, or at the calibration transmitter, or even, and preferably, by another apparatus.

The goniometry apparatus and the calibration transmitter can be in communication with each other, through a one-way or two-way communication channel.

Such a communication can be used, for example, to synchronize the goniometry apparatus and the calibration transmitter during the calibration measurements, in particular in order to know and adjust the relative positions of the goniometry apparatus and the calibration transmitter, the frequencies of the calibration signals transmitted by the transmitter, etc.

The polarization of each calibration signal can be any one of the following polarizations:
vertical linear polarization,
horizontal linear polarization,
right circular polarization,
left circular polarization,
etc.

According to at least one embodiment of the invention, proposed is a system for calibrating an airborne goniometry apparatus comprising means configured for implementing the method according to the invention.

In particular, in one or more embodiments, the system according to the invention can comprise:
  a goniometry apparatus comprising an antenna array, intended to be on board an aerial carrier, and
  at least one calibration transmitter, intended to transmit at least two calibration signals with orthogonal polarizations in the direction of said goniometry apparatus.

In particular, the system according to one or more embodiments of the invention can comprise, in terms of technical means, all the features described above with reference to the method according to the invention and which are not mentioned herein, in detail, for brevity.

The calibration transmitter can be arranged at ground level. In particular, in one or more embodiments, the signal transmitter can be disposed on the ground, or on a vehicle.

In at least one embodiment, the calibration transmitter is at a fixed geographical location.

In one or more embodiments, the calibration transmitter can comprise a single dual orthogonal polarization transmission antenna, and in particular +45°/−45°. Thus, the calibration signals with orthogonal polarizations can be transmitted with a single antenna.

Alternatively, in one or more embodiments, the calibration transmitter can comprise two antennas configured, and in particular oriented, following two orthogonal polarizations.

In any case, in at least one embodiment, the calibration transmitter can comprise at least one generator supplying the antenna(s) with electrical signals corresponding to radiofrequency signals to be transmitted.

Advantageously, in one or more embodiments, the system according to the invention can comprise a first positioner to modify, or adjust, the angular position of the transmitter, and in particular of the transmission antenna(s).

The first positioner can be configured to modify or adjust the look direction of the transmission antenna(s) in azimuth and/or in elevation.

The first positioner can be a motorized positioner controlled by at least one control signal provided by a control unit, such as an electronic card, a computer, a calculator, etc. Such a control unit can be, for example, a control unit of the calibration unit.

In at least one embodiment, the first positioner can be controlled in order for the look direction of the transmission antenna(s) of the calibration transmitter to always be directed towards the goniometry apparatus in flight.

Advantageously, the system according to one or more embodiments of the invention can comprise a second positioner to modify, or adjust, the angular position of the antenna array of the goniometry apparatus.

The second positioner can be configured to modify or adjust the look direction of the antenna array in azimuth and/or in elevation.

The second positioner can be a motorized positioner controlled by at least one control signal provided by a control unit, such as an electronic card, a computer, a calculator, etc. Such a control unit can be, for example, a control unit of the goniometry apparatus.

In at least one embodiment, the second positioner can be controlled such that the look direction of the antenna array is always aimed by the calibration transmitter.

Furthermore, the system according to one or more embodiments of the invention can comprise a geolocation module, such as a GPS module, on the goniometry apparatus side in order to locate the position of said goniometry apparatus.

The position of the goniometry apparatus can be used to ensure that, or to adjust if appropriate, the goniometry apparatus is correctly in an angular position of reception for which a calibration data measurement is intended.

Alternatively or additionally, in one or more embodiments, the position of the goniometry apparatus can be in communication towards the calibration transmitter, to adjust the orientation of the calibration transmitter, with a view to ensuring that the look position of said calibration transmitter is in the direction of the goniometry apparatus.

The geolocation module can be a geolocation module of the aerial carrier. Alternatively, in one or more embodiments, the geolocation module can be a geolocation module dedicated to the goniometry apparatus, and in particular forming part of the goniometry apparatus.

Advantageously, the system according to one or more embodiments of the invention can further comprise a module, disposed on the goniometry apparatus side, in order to determine at least one tilt of said goniometry apparatus, and/or the aerial carrier.

Said at least one tilt can be used to correct, or adjust the angular position of reception with respect to the calibration transmitter. Indeed, the tilt or the orientation of the goniometry apparatus, and especially of the aerial carrier, can modify the position of reception of said goniometry apparatus relative to the calibration transmitter.

The tilt measurement module can be a module of the aerial carrier. Alternatively, in one or more embodiments, the tilt measurement module can be a module dedicated to the goniometry apparatus, and in particular forming part of the goniometry apparatus.

The tilt measurement module can, for example, be an inertial unit measuring one or more tilt angles, according to one or more directions.

The system according to one or more embodiments of the invention can further comprise at least one calculation unit intended to calculate, by interpolation, calibration data for at least one unmeasured polarization, or an unmeasured frequency or an unmeasured angular position.

Such a unit can be a computer, a calculator, a server, etc. and more generally any data processing apparatus configured to perform such an interpolation, for example by means of a computer program intended for this purpose and that is executed by said calculation unit.

The calculation unit can be integrated in the goniometry apparatus. Alternatively, the calculation unit can be integrated in an apparatus, dedicated or not, independent from said goniometry apparatus.

The calculation unit can be a physical machine or a virtual machine.

Furthermore, in one or more embodiments, the goniometry apparatus and the calibration unit can be equipped with communication modules that enable them to communicate with each other.

The communication between the goniometry apparatus and the calibration transmitter can be performed through a one-way or two-way communication channel.

The communication can, in particular, be used to synchronize the transmitter and the goniometry apparatus for calibration, in particular regarding their relative positions so as to obtain a given angular position of reception, and/or regarding the frequency of the calibration signals, and more generally to synchronize a calibration sequence.

BRIEF DESCRIPTION OF THE DRAWINGS

Other benefits and features shall become evident upon examining the detailed description of one or more embodiments of the invention, and from the enclosed drawings in which.

DETAILED DESCRIPTION OF THE INVENTION

It is understood that the embodiments disclosed hereunder are by no means limiting. In particular, it is possible to imagine variants of the invention that comprise only a selection of the features disclosed hereinafter in isolation from the other features disclosed, if this selection of features is sufficient to confer a technical benefit or to differentiate the invention with respect to the prior state of the art. This selection comprises at least one preferably functional feature which lacks structural details, or only has a portion of the structural details if that portion is only sufficient to confer a technical benefit or to differentiate the invention with respect to the prior state of the art.

In the figures the same reference has been used for the features that are common to several FIGURES.

Figure 1A:
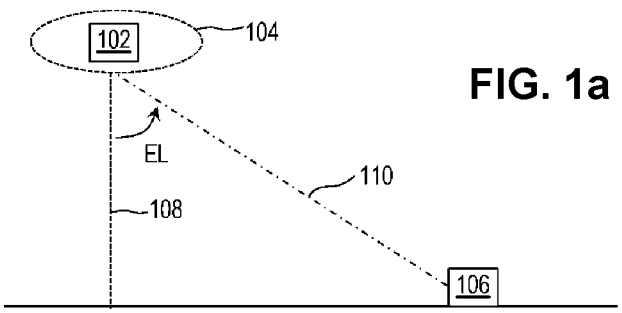
FIGS. 1a and 1b are schematic depictions of a configuration for calibrating an airborne goniometry apparatus, according to one or more embodiments of the invention.
Figure 1B:
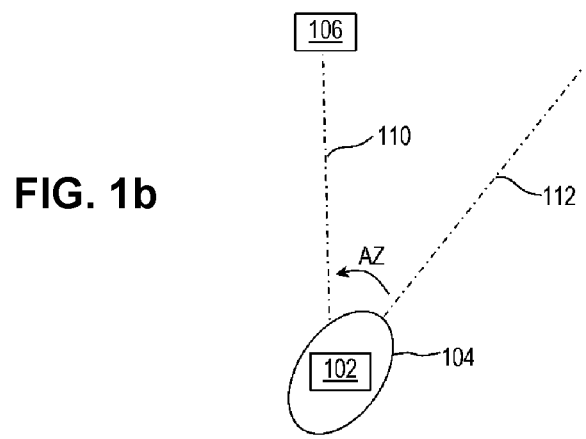

FIGS. 1a and 1b are schematic depictions of a configuration for calibrating in-flight an airborne goniometry apparatus, respectively according to a side view and according to a top view; according to one or more embodiments of the invention.

FIGS. 1a and 1b schematically show a goniometry apparatus 102 transported by an aircraft, such as for example an airplane 104, according to at least one embodiment. Conventionally, the goniometry apparatus 102 comprises an antenna array (not shown) consisting of several antennas to each measure, upon reception, an amplitude datum and a phase datum for a received radiofrequency signal. The amplitude datum and the phase datum form a complex vector, the norm of which represents the amplitude value and the angle represents the phase value.

A calibration transmitter 106, of known position, is used to calibrate the airborne goniometry apparatus 102. The calibration transmitter 106, in at least one embodiment, can be stationary or mobile. The calibration transmitter 106, in at least one embodiment, can for example be disposed on the ground. For the calibration, in at least one embodiment, the calibration transmitter 106 is aimed at all times towards the goniometry apparatus 102.

The calibration of the goniometry apparatus 102 is performed as follows. Calibration signals with known frequencies and polarizations are transmitted by the calibration transmitter 106 in the direction of the goniometry apparatus 102, while it is in flight. For each calibration signal received, each antenna of the antenna array of the goniometry apparatus measures a data pair {Amplitude, Phase}. This data pair measured by each antenna is stored in association with:
- the frequency of the calibration signal: this frequency is known;
- the polarization of the calibration signal: this polarization is also known and
- the angle of reception, that is the relative angular position between the calibration transmitter 106 and the goniometry apparatus 102. This angular position is also known. Generally, this angular position is expressed in the form of an elevation angle and an azimuth angle of the airborne goniometry apparatus 102 with respect to the calibration transmitter 106.

For each angular position of the airborne goniometry apparatus 102 with respect to the calibration transmitter, in at least one embodiment, the calibration step can be repeated for different frequencies, or frequency bands, with a view to scanning an entire range of frequencies, in the context of a calibration sequence.

Furthermore, in at least one embodiment, the calibration steps can be repeated in several angular positions of reception, always within the context of a calibration sequence.

Thus, in at least one embodiment, at the end of calibration, a calibration table is obtained for a plurality of angular positions, with calibration data measure for a plurality of frequencies for each angular position. This calibration table comprises, for each {frequency, position} pair a calibration value for a given polarization.

As indicated above, in at least one embodiment, the goniometry apparatus 102 comprises an array of antennas. In this case, in at least one embodiment, the calibration value can, in an entirely non-limiting manner, be a covariance matrix indicating the reception differences between said reception antennas, that is the differences between the complex vectors measured by each reception antenna.

The position of the calibration transmitter 106 with respect to the goniometry apparatus 102 can be given by a combination of two angles, namely:
- an elevation angle, also referred to as angle of site, denoted EL, shown in FIG. 1a, corresponding to the angle formed between on the one hand the vertical direction 108 between the goniometry apparatus 102 (and thus the aircraft 104) and the ground, and on the other hand the direction 110 connecting the goniometry apparatus 102 (and thus the aircraft 104) and the calibration generator 106; and
- an azimuth angle, also referred to as bearing angle, denoted AZ, shown in FIG. 1b, which corresponds to the angle, in the horizontal plane, between on the one hand the direction 110 connecting the aircraft 104 and the calibration transmitter 106, and on the other hand a reference direction 112, for example magnetic north.

These angles AZ and EL can be provided by sensors equipping the goniometry apparatus 102 and/or sensors equipping the aircraft 104.

Alternatively, in at least one embodiment, these angles AZ and EL can be calculated from a piece of altitude data and a piece of geolocation data of the aircraft 104, respectively from the goniometry apparatus 102, provided by sensors equipping said aircraft 104 or said goniometry apparatus 102. Indeed, since the geolocation of the calibration transmitter 106 is known, the azimuth and elevation angles can be calculated from the altitude and the geolocation of the goniometry apparatus 102 (or of the aircraft 104).

Each calibration signal transmitted by the calibration transmitter 106 can be a signal burst.

Thus, in one or more embodiments, during a calibration phase, it is very important for the goniometry apparatus 102 to know the frequency and polarization of each calibration signal transmitted by the calibration transmitter 106, at the time when it receives this calibration signal. This preferably requires the goniometry apparatus 102 and the calibration transmitter 106 to be synchronized so that when the calibration transmitter 106 transmits a calibration signal, the goniometry apparatus 102 knows the frequency and the polarization of said calibration signal in order to store the measured values in association with said frequency and said polarization.

Figure 2:
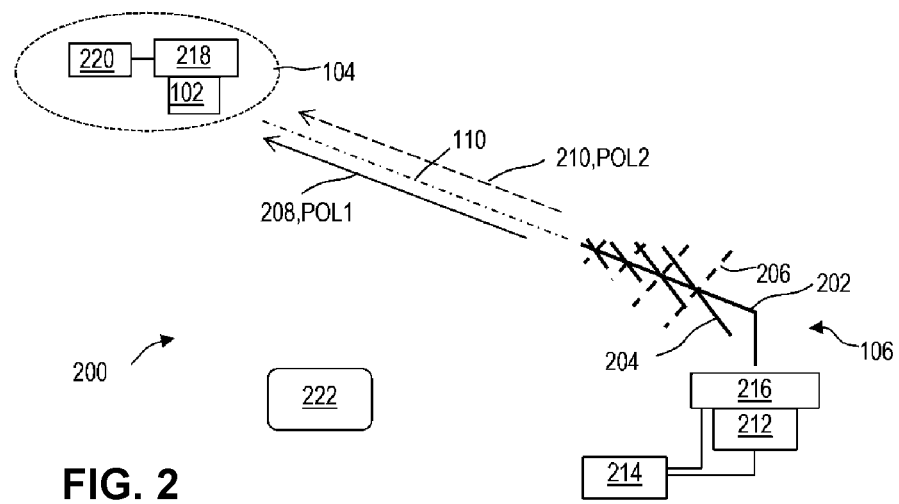
FIG. 2 is a schematic depiction of a calibration method of an airborne goniometry apparatus according to one or more embodiments of the invention.

FIG. 2 is a schematic depiction of a system for calibrating an airborne goniometry apparatus according to one or more embodiments of the invention.

The system 200 of FIG. 2 comprises the goniometry apparatus 102 on board the aerial carrier 104, and the calibration transmitter 106 in the configuration described in reference to FIGS. 1a and 1b.

In the system 200, in one or more embodiments, the calibration transmitter 106 comprises a dual polarization antenna 202. In particular, in one or more embodiments, the dual polarization antenna 202 consists of a first radiating part 204 and a second radiating part 206. The two radiating parts 204 and 206 are aimed towards the goniometry apparatus 102 according to the direction 110 and are perpendicular to each other. For example, in one or more embodiments, the first radiating part 204 is tilted according to an angle of −45° about the direction 110, and the second radiating part 206 is tilted according to an angle of +45° about the direction 110. Thus, in operation, the radiating part 204 transmits a calibration signal 208 with polarization POL1 perpendicular to the polarization POL2 of a calibration signal 210 transmitted by the second part 206.

The calibration signals 208 and 210, with perpendicular polarizations POL1 and POL2, are received by the antenna array of the goniometry apparatus 102 on board the aerial carrier 104. For each calibration signal 208 and 210, in one or more embodiments, each antenna of the antenna array measures an amplitude datum and a phase datum forming a complex vector. Thus, in one or more embodiments, for each calibration signal, the antenna array measures a data set comprising for each antenna an amplitude datum and a phase datum forming a complex vector. This data set is stored in association with:
- the known frequency of the calibration signal,
- the known polarization of the calibration signal, and
- the known angular position of the goniometry apparatus 102 with respect to the transmitter 106, this angular position being given by an azimuth angle AZ and elevation angle EL angle pair and corresponding to the angle of reception of the calibration signal.

In the system 200, in one or more embodiments, the calibration transmitter 106 further comprises a calibration signal generator 212 supplying the dual polarization antenna 202. For each calibration signal 208 and 210, in one or more embodiments, the generator 212 generates an electrical signal representative of said calibration signal. This electrical signal is provided to the dual polarization antenna, in particular to the relevant radiating part of the dual polarization antenna 202, which then transmits the calibration signal 208 or 210.

According to at least one embodiment, the two calibration signals 208 and 210 can be transmitted one at a time. In this case, in one or more embodiments, the two calibration signals 208 and 210 can have the same frequency, namely the frequency at which the goniometry apparatus is to be calibrated.

According to at least one embodiment, the two calibration signals can be transmitted simultaneously. In this case, it is necessary to distinguish the two calibration signals received. To this end, in one or more embodiments, the two calibration signals 208 and 210 can have a slight frequency shift, denoted Δ, that is negligible in value with respect to the frequency of these signals, enabling these signals received on the goniometry apparatus side to be distinguished. For example, in one or more embodiments, if the goniometry apparatus is to be calibrated at a frequency F, one of the calibration signals can have a frequency F+Δ/2, and the other of the calibration signals can have a frequency F−Δ/2. According to at least one embodiment, one of the calibration signals can have a frequency F, and the other of the calibration signals can have a frequency F−Δ, or F+Δ. The value of the frequency shift Δ can be equal, and in particular must be at least equal, to the frequency splitter of the goniometry apparatus.

Optionally, but particularly advantageously, in one or more embodiments, the calibration transmitter 106 can further comprise a control module 214 enabling the frequency of the calibration signals 208 and 210 to be modified. Thus, in one or more embodiments, for a relative angular position between the goniometry apparatus 102 and the calibration transmitter 106, it is possible to perform a calibration for several frequencies, and preferably for an entire range of frequencies.

Optionally, but particularly advantageously, in one or more embodiments, the calibration transmitter 106 can further comprise a positioner 216 enabling the orientation of the dual transmission antenna 202 to be modified about at least one direction. In particular, in one or more embodiments, the positioner 216 can be disposed to modify/adjust the look direction of the dual polarization antenna 202 such that it is always aimed towards the goniometry apparatus 102 during calibration. For example, in one or more embodiments, the positioner 216 can be intended to modify the look direction of the dual polarization antenna 202 in the horizontal plane and in the vertical plane, that is the azimuth angle and the elevation angle of the look direction of the dual polarization antenna 202. The positioner 216 can be a motorized platform controlled by the control module 214.

Optionally, but particularly advantageously, in one or more embodiments, the calibration transmitter 106 can further comprise a communication module (not shown) with the goniometry apparatus 102, to synchronize the calibration transmitter 106 with the goniometry apparatus 102 during the calibration.

Optionally, but particularly advantageously, in one or more embodiments, the system 200 can comprise a positioner 218 enabling the orientation of the goniometry apparatus 102 and in particular the antenna array of the goniometry apparatus 102 to be modified. Such a positioner 218 thus enables orientation drifts due to, for example, the tilt of the aerial carrier 104 to be corrected in order to ensure the relative angular position of the goniometry apparatus 102 and the transmitter 106. The positioner 218 can be disposed to modify/adjust the look direction of the antenna array of the goniometry apparatus 102 such that it is always aimed towards the calibration transmitter 106. For example, in one or more embodiments, the positioner 218 can be intended to modify the look direction of the antenna array in the horizontal plane and in the vertical plane, that is the azimuth angle and the elevation angle of the look direction of the antenna array. The positioner 218 can for example be a motorized platform. The positioner 218 can be controlled, for example, by a control module 220 of said goniometry apparatus 102 depending on orientation data measured for example by an inertial unit (not shown) associated with said goniometry apparatus 102 or with the aerial carrier 104.

Optionally, but particularly advantageously, in one or more embodiments, the system 200 can further comprise a communication module enabling the calibration the goniometry apparatus 102 to communicate with the calibration transmitter 106, to synchronize said calibration transmitter 106 with said goniometry apparatus 102 during the calibration.

Optionally, but particularly advantageously, in one or more embodiments, the system 200 can comprise a geolocation module (not shown) to detect the position of the goniometry apparatus 102 during calibration. Such a geolocation module can be associated with, or integrated into, the goniometry apparatus 102 or the aerial carrier 104.

Thus, the system according to one or more embodiments of the invention enables, for a given calibration frequency F, calibration data to be measured once (or in a single passage in one angular position) for two vertical polarizations POL1 and POL2 at this frequency.

Once the calibration data has been measured for these orthogonal polarizations POL1 and POL2, in one or more embodiments, it is then possible to determine, by calculation, calibration data for all the possible polarizations of a radiofrequency wave at this same frequency F, since all the polarizations decompose on the orthogonal base formed by the polarizations POL1 and POL2. Ultimately, the system according to the invention enables, for a given calibration frequency F, calibration data to be determined once (or in a single passage in one angular position) for all the possible polarizations of a radiofrequency wave at the frequency F.

Optionally, but particularly advantageously, in one or more embodiments, the system 200 can comprise a calculation unit 222 to calculate the calibration data of a radiofrequency wave with frequency F and polarization $POL_{int}$, different from polarizations POL1 and POL2, from calibration data measured at frequency F for the polarizations POL1 and POL2. To that end, in one or more embodiments, the polarization POL3 is projected on the orthogonal base formed by the orthogonal polarizations POL1 and POL2. Then, in one or more embodiments, the calibration data measured for each of the polarizations POL1 and POL2 are used to calculate, by interpolation, the calibration data corresponding to each component of the polarization $POL_{int}$. Lastly, the calibration data obtained for each component of the polarization $POL_{int}$ are reconstructed in order to obtain the calibration data of the polarization $POL_{int}$, at the frequency F.

Optionally, but particularly advantageously, in one or more embodiments, the calculation unit 222 can further be configured to calculate, for a polarization POL and an angular position POS, calibration data for at least one unmeasured frequency $F_{int}$ at said angular position POS and for said polarization POL, by frequency interpolation of the calibration data measured for several frequencies at said angular position POS and for said polarization POL. The frequency interpolation can be performed by all known functions. For example, in one or more embodiments, the frequency interpolation can be performed by the GRID-DATA function. Thus, it is possible to obtain calibration data even for frequencies for which calibration data has not been measured in-flight.

Optionally, but particularly advantageously, in one or more embodiments, the calculation unit 222 can further be configured to calculate, for a given frequency F and polarization POL, calibration data for at least one unmeasured angular position $POS_{int}$, by angular interpolation of the calibration data measured for several angular positions at said frequency F and for said polarization. The angular interpolation can be performed by all known functions. For example, in one or more embodiments, the angular interpolation can be performed by the GRIDDATA function. Thus, it is possible to obtain, by calculation, calibration data even for angular positions for which calibration data has not been measured in-flight.

In the example of FIG. 2, in one or more embodiments, a single calculation unit 222 is used to perform all the described interpolations. Obviously, in one or more embodiments, it is possible to use a dedicated and individual calculation unit for at least one, in particular each, of the described interpolations.

The calculation unit 222 can be disposed on the goniometry apparatus 102 side, and in particular be integrated in the goniometry apparatus 102. Alternatively, in one or more embodiments, the calculation unit 222 can be disposed on the calibration transmitter 106 side, and in particular be integrated in the calibration transmitter 106. According to at least one embodiment, the calculation unit 222 can be disposed at another site, and be in the form of a physical or virtual machine, integrated or not in another physical apparatus.

The calculation unit 222 can be a computer, a calculator, a server, a programmable chip, etc.

Figure 3:
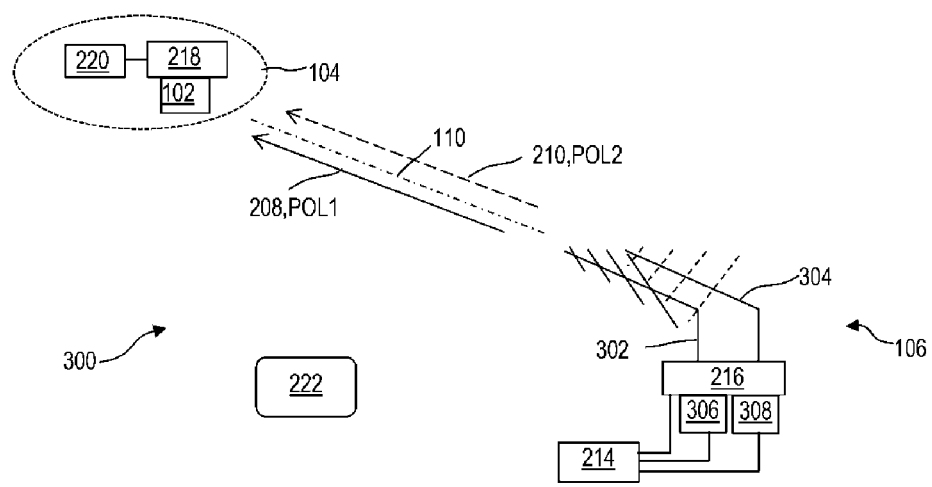
FIG. 3 is a schematic depiction of another calibration method of an airborne goniometry apparatus according to one or more embodiments of the invention.

FIG. 3 is a schematic depiction of another system according to one or more embodiments of the invention for calibrating in flight an airborne goniometry apparatus.

The system 300 of the FIG. 3 comprises all the elements of the system 200 of FIG. 2, except with regards to the following differences.

In the system 300, in one or more embodiments, the calibration transmitter comprises not one dual polarization antenna but two separate antennas, 302 and 304, perpendicular to each other about the direction 110. Each of the antennas 302 and 304 is supplied by a calibration signal generator, respectively 306 and 308, individual and dedicated to said antenna.

According to one or more embodiments of the invention, it is possible to provide a single signal generator that is common to the two antennas 302 and 304.

Figure 4:
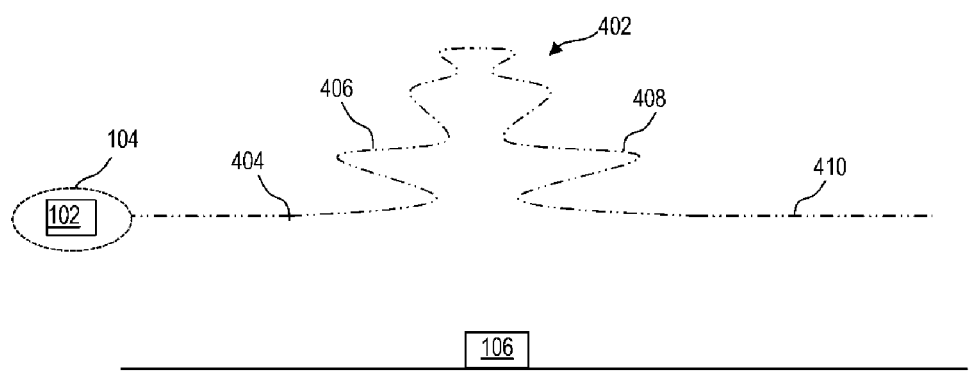
FIG. 4 is a schematic representation of a calibration path that can be implemented in one or more embodiments of the invention.

FIG. 4 is a schematic representation of a calibration path that may be used in the one or more embodiments of the invention.

The goniometry apparatus 102 on board the aerial carrier 104 can be moved to perform the calibration measurements in several relative angular positions between said goniometry apparatus 102 and the calibration transmitter 106, that is for several angles of reception, in one or more embodiments.

To this end, in one or more embodiments, the goniometry apparatus 102 can be moved in flight along a calibration path comprising a multitude of angular positions, along a constant or variable angular pitch. The angular pitch can be a combination of an angular azimuth pitch and an angular elevation pitch, or only one of these pitches.

FIG. 4 gives a non-limiting example of such a calibration path, according to one or more embodiments of the invention. The calibration path 402, represented in FIG. 4 by way of example enables a maximum of azimuth angles and elevation angles to be covered in a minimum amount of time.

The calibration path 402 comprises:
starting from very far from the calibration transmitter 106 and moving closer towards said calibration transmitter 106: a horizontal path 404 followed by an upward helical path 406 until the apparatus is directly above the calibration transmitter 106; and
starting directly above the calibration transmitter 106 and moving away from the calibration transmitter 106: a downward helical path 408 followed by a horizontal linear path 410.

Of course, this calibration path is not limiting and other calibration paths can be used in the context of one or more embodiments of the invention.

Figure 5:
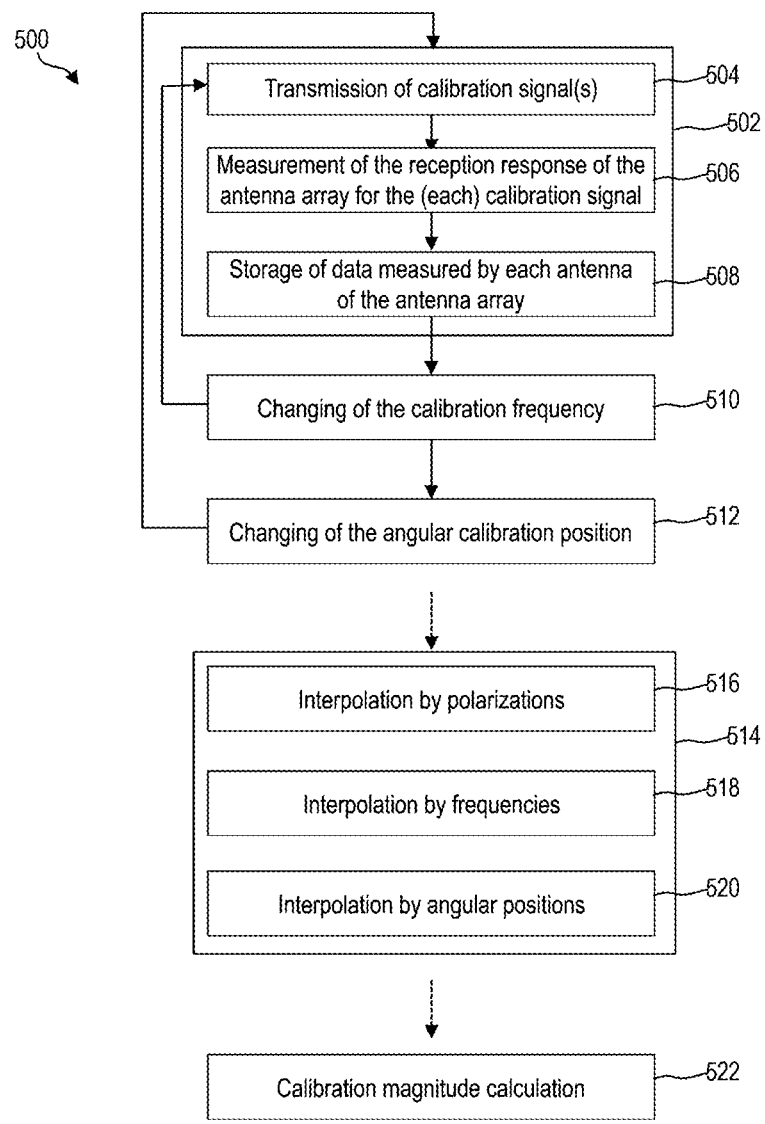
FIG. 5 is a schematic depiction of a method according to one or more embodiments of the invention.

FIG. 5 is a schematic depiction of a method according to one or more embodiments of the invention for calibrating an airborne goniometry apparatus.

The method 500 of FIG. 5, in one or more embodiments, can be implemented by a system according to the invention, and in particular by any one of the systems 200 or 300 of FIG. 2 or 3.

The method 500 comprises a step 502 for calibrating the goniometry apparatus when it is on board an aerial carrier. The step 502 is performed by an angular position and a given frequency.

The step 502 includes a step 504 for transmitting at least two calibration signals, with orthogonal polarizations, by a calibration transmitter aimed towards the goniometry apparatus in flight.

The step 502 then includes a step 506 for measuring, for each antenna of the antenna array of the goniometry apparatus, an amplitude datum and a phase datum, for each calibration signal.

According to at least one embodiment, the steps 504 and 506 are performed simultaneously since the calibration signals are transmitted simultaneously. According to at least one embodiment, the steps 504 and 506 are performed first by one of the calibration signals, for example the calibration signal 208 with polarization POL1, then by the other of the calibration signals, for example by the calibration signal 210 with polarization POL2.

During a step 508, in one or more embodiments, the data measured by each antenna of the antenna array are stored in association with the frequency of the calibration signal, the polarization of the calibration signal, the relative angular position of the calibration transmitter with respect to the goniometry apparatus.

In the case the calibration relates to a range of frequencies, in one or more embodiments, the method 500 comprises a step 510 for changing the frequency of the calibration signals and a new iteration of the calibration step 502 is performed. The steps 502 and 510 are repeated and so on so as to perform a frequency scan of the range of frequencies. The frequency scan can be, for example, performed along a constant or variable frequency pitch depending on the relevant frequencies.

Once the entire range of calibration frequencies has been scanned, in one or more embodiments, the goniometry apparatus is moved, during a step 512, such that it is positioned in a new angular position, for example along a predetermined calibration path, for example the path 402 of FIG. 4. In practice, in one or more embodiments, the range of frequencies is scanned very quickly such that the aerial carrier is not stopped at a given position and travels the calibration path without stopping.

When the aerial carrier, and in particular the goniometry apparatus, is at a new angular position, the steps 502-510 are repeated. The angular position of the goniometry apparatus is thus again modified for a new iteration of steps 502-510, and so on to scan the range of angular positions, preferably along a calibration path. Scanning angular positions can, for example, be performed along a constant angular pitch, or a variable angular pitch depending on the position of the goniometry apparatus with respect to the calibration transmitter.

After having scanned the range of angular positions, in one or more embodiments, the goniometry apparatus no longer needs to be in flight. The aerial carrier can therefore land.

The method 500, in one or more embodiments, can optionally comprise a step 514 for interpolating calibration data comprising any combination of the following interpolation steps.

For example, in one or more embodiments, the interpolation step 514 can comprise a step 516 for interpolating calibration data for at least one unmeasured polarization $POL_{int}$ in an angular position POS and a frequency F, based on previously measured calibration data for the polarizations of calibration signals, at this angular position POS and at this frequency F. To this end, in one or more embodiments, the polarization $POL_{int}$ is projected on the orthogonal base formed by the orthogonal polarizations of the calibration signals, for example POL1 et POL2. Then, in one or more embodiments, the calibration data measured at this frequency F and at this angular position POS for each of the polarizations POL1 and POL2 are used to calculate the calibration data corresponding to each component of the polarization $POL_{int}$. Lastly, in one or more embodiments, the calibration data obtained for each component of the polarization $POL_{int}$ are reconstructed in order to obtain the calibration data of the polarization $POL_{int}$, at the frequency F.

The interpolation step 514 can comprise a step 518 for interpolating calibration data for at least one unmeasured frequency $F_{int}$ in an angular position POS and a polarization POL, based on previously measured or calculated calibration data for other frequencies at this angular position POS and for the same polarization POL. This frequency interpolation step 518 can be performed by any interpolation function, in one or more embodiments, for example GRID-DATA, the input being the previously measured or calculated calibration data.

The interpolation step 514 can further comprise a step 520 for interpolating calibration data for at least one unmeasured angular position $POS_{int}$ at a frequency F and a polarization POL, based on previously measured or calculated calibration data for other angular positions at this frequency and for the same polarization POL. This angular interpolation step 520 can be performed by any interpolation function, for example GRIDDATA, the input being the previously measured or calculated calibration data.

The method 500, in one or more embodiments, can optionally comprise a step 522 of calculating a calibration magnitude for at least one angular position POS, a frequency F and a polarization POL, based on measured or calculated calibration data for each antenna of the antenna array. According to at least one embodiment, this calibration magnitude can be a covariance matrix between the measured/calculated reception data for each of the antennas of the antenna array for this position POS, this frequency F and this polarization.

Of course, the invention is not limited to the examples detailed herein before given for purposes of illustration and the general scope of the one or more embodiments of the invention is defined in the claims.

The invention claimed is:

1. A method for calibrating at low frequency and in-flight a goniometry apparatus comprising an antenna array, on board an air carrier, said method comprising, for an angular position of reception:
    calibrating said goniometry apparatus at a given frequency, comprising
        transmitting, by means of a calibration transmitter, at said given frequency and in a direction of said goniometry apparatus, at least two calibration signals, with polarizations orthogonal to each other, and
        measuring a response of said antenna array for each of said at least two calibration signals.

2. The method according to claim 1, wherein the at least two calibration signals are transmitted simultaneously and comprise a frequency shift therebetween that is negligible with respect to their frequency of 200 kHz.

3. The method according to claim 1, further comprising, for the angular position of reception, several iterations of the calibrating said goniometry apparatus for different frequencies so as to perform a frequency scan over a given range of frequency.

4. The method according to claim 1, further comprising several iterations of the calibrating said goniometry apparatus in different angular positions of reception, following a predetermined calibration path.

5. The method according to claim 4, wherein the predetermined calibration path comprises any combination of at least one of the following paths:
    at least one horizontal linear path,
    at least one upward helical path, and
    at least one downward helical path.

6. The method according to claim 1, further comprising, for said angular position and a frequency, calculating by interpolation calibration data for at least one target polarization, which is different from orthogonal polarizations, based on calibration data measured at said frequency and at said angular position.

7. A system for calibrating an airborne goniometry apparatus comprising:
    a goniometry apparatus comprising an antenna array, configured to be on board an aerial carrier, and
    at least one calibration transmitter, intended configured to transmit at least two calibration signals with orthogonal polarizations in a direction of said goniometry apparatus;
    configured to implement a method for calibrating at low frequency and in-flight said goniometry apparatus, wherein for an angular position of reception
        calibrating said goniometry apparatus at a given frequency, comprising
            transmitting, by means of said at least one calibration transmitter, at said given frequency and in said direction of said goniometry apparatus, said at least two calibration signals, with said orthogonal polarizations orthogonal to each other, and
            measuring a response of said antenna array for each of said at least two calibration signals.

8. The system according to claim 7, wherein the at least one calibration transmitter comprises a single dual orthogonal polarization transmission antenna with radiating parts at +45°/−45°.

9. The system according to claim 7, further comprises a first positioner for modifying a look direction of the at least one calibration transmitter, in azimuth and/or in elevation.

10. The system according to claim 9, further comprising a second positioner for modifying a look direction of the antenna array, in azimuth and/or in elevation.

11. The system according to claim 7, further comprising a geolocation module on a side of the goniometry apparatus to locate a position of said goniometry apparatus.

12. The system according to claim 7, further comprising a module, disposed on a side of the goniometry apparatus, to determine at least one tilt of said goniometry apparatus and/or of the aerial carrier.

13. The system according to claim 7, further comprising at least one calculation unit configured to calculate, by interpolation, calibration data for at least one unmeasured polarization, or an unmeasured frequency or an unmeasured angular position.

14. The system according to claim 7, wherein the goniometry apparatus and the at least one calibration transmitter are equipped with communication modules enabling them to communicate with each other.

* * * * *